(12) United States Patent
Mori et al.

(10) Patent No.: US 11,293,122 B2
(45) Date of Patent: Apr. 5, 2022

(54) AIRBAG AND METHOD OF PRODUCING WEAVING PATTERN FOR THE SAME

(71) Applicant: TOYOTA BOSHOKU KABUSHIKI KAISHA, Aichi (JP)

(72) Inventors: Hiromasa Mori, Aichi-ken (JP); Takashi Yokoyama, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 189 days.

(21) Appl. No.: 16/409,016

(22) Filed: May 10, 2019

(65) Prior Publication Data

US 2019/0345650 A1 Nov. 14, 2019

(30) Foreign Application Priority Data

May 14, 2018 (JP) .............................. JP2018-092722

(51) Int. Cl.
| | |
|---|---|
| *D03D 1/02* | (2006.01) |
| *D03D 13/00* | (2006.01) |
| *B60R 21/235* | (2006.01) |

(52) U.S. Cl.
CPC ............. *D03D 1/02* (2013.01); *D03D 13/004* (2013.01); *D03D 13/008* (2013.01); *B60R 2021/23542* (2013.01)

(58) Field of Classification Search
CPC ...... D03D 1/02; D03D 13/004; D03D 13/008; D03D 2700/0111; B60R 2021/23542
See application file for complete search history.

(56) References Cited

U.S. PATENT DOCUMENTS

| | | | |
|---|---|---|---|
| 6,296,276 B1 | 10/2001 | Ritter | |
| 6,398,253 B1 | 6/2002 | Heigl | |
| 6,734,125 B2* | 5/2004 | Veiga | ...................... B32B 27/04 |
| | | | 139/384 R |
| 6,748,980 B2* | 6/2004 | Matsui | .................. B60R 21/235 |
| | | | 139/384 R |
| 2010/0253047 A1* | 10/2010 | Youn | .................... D06N 3/0002 |
| | | | 280/728.1 |

FOREIGN PATENT DOCUMENTS

| | | |
|---|---|---|
| JP | 2001-138852 | 5/2001 |
| JP | 2004-100056 A | 4/2004 |

OTHER PUBLICATIONS

Office Action in counterpart Japanese Patent Application No. JP2018-092722 dated Nov. 2, 2021, along with English translation thereof.

* cited by examiner

*Primary Examiner* — Khoa D Huynh
*Assistant Examiner* — Erick I Lopez
(74) *Attorney, Agent, or Firm* — Greenblum & Bernstein, P.L.C.

(57) ABSTRACT

An airbag includes a bag portion and a plain cloth portion. The bag portion is woven by double weave. The plain cloth portion is woven by plain weave at an edge of the bag portion. The bag portion and the plain cloth portion include warp threads and filling threads. The bag portion and the plain cloth portion are woven by a one piece woven method to satisfy: (1) each warp thread is not over four consecutive filling threads and each filling thread is not over four consecutive warp threads around a border between the bag portion and the plain cloth portion; and (2) every two adjacent warp threads are not over two adjacent filling threads and every two adjacent filling threads are not over two adjacent warp threads around the border.

11 Claims, 16 Drawing Sheets

| | DRAFT WEAVING PATTERN | WEAVING PATTERN |
|---|---|---|
| 1 |  |  |
| 2 |  |  |
| 3 |  |  |
| 4 |  |  |
| 5 |  |  |
| 6 |  |  |
| 7 |  |  |
| 8 |  |  |
| 9 |  |  |
| 10 |  |  |

| | DRAFT WEAVING PATTERN | WEAVING PATTERN |
|---|---|---|
| 21 | | |
| 22 | | |
| 23 | | |
| 24 | | |
| 25 | | |
| 26 | | |
| 27 | | |
| 28 | | |
| 29 | | |
| 30 | | |

FIG.16

| | DRAFT WEAVING PATTERN | WEAVING PATTERN |
|---|---|---|
| 31 | | |
| 32 | | |
| 33 | | |
| 34 | | |
| 35 | | |
| 36 | | |
| 37 | | |
| 38 | | |
| 39 | | |

AIRBAG AND METHOD OF PRODUCING WEAVING PATTERN FOR THE SAME

CROSS REFERENCE TO RELATED APPLICATION

This application claims priority from Japanese Patent Application No. 2018-092722 filed on May 14, 2018. The entire contents of the priority application are incorporated herein by reference.

TECHNICAL FIELD

The technology described herein relates to an airbag and a method of producing a weaving pattern for the airbag.

BACKGROUND

Airbags are widely used in safety systems of vehicles. In a safety system of a vehicle, an airbag inflates when an external force larger than a threshold is applied to the vehicle and then quickly deflates to protect an occupant of the vehicle from an impact. An example of the airbag is a one-piece woven (OPW) airbag including one piece of a bag that is woven using the OPW technology. The airbag includes a bag portion that is a double cloth portion and a plain cloth portion that is at edges of the bag portion. The bag portion inflates but the plain cloth portion does not inflate.

When the bag portion inflates, a stress is applied to a border between the bag portion and the plain cloth portion. If threads are displaced from each other due to the stress, airtightness of the airbag may decrease. To solve such a problem, a thickness of a film (e.g. a silicone film) on a surface of the airbag may be increased. Namely, a larger amount of a material may be required for the film and thus a production cost may increase.

SUMMARY

The technology described herein was made in view of the foregoing circumstances. An object is to maintain airtightness of an airbag without increasing a thickness of a film on a surface of the airbag.

An airbag includes a bag portion and a plain cloth portion. The bag portion is woven by double weave. The plain cloth portion is woven by plain weave at an edge of the bag portion. The bag portion and the plain cloth portion include warp threads and filling threads. The bag portion and the plain cloth portion are woven by a one piece woven method to satisfy: (1) each warp thread is not over four consecutive filling threads and each filling thread is not over four consecutive warp threads around a border between the bag portion and the plain cloth portion; and (2) every two adjacent warp threads are not over two adjacent filling threads and every two adjacent filling threads are not over two adjacent warp threads around the border.

The plain cloth portion at the edge of the bag portion is prepared by plain weave and thus stronger than the bag portion. Therefore, the airbag has strength at the border between the bag portion and the plain cloth portion. With the plain cloth portion, the displacement of the threads is less likely to occur when the bag portion is inflated. If a larger number of the warp floats and the weft floats are present. the displacement of the threads is more likely to occur. By weaving the bag portion and the plain cloth portion according to the weaving pattern to satisfy conditions (1) and (2), the warp threads are less likely to run over more than four consecutive filling threads or the filling threads are less likely to run over more than four consecutive warp threads. Therefore, the displacement of the threads is less likely to occur and thus the airtightness of the airbag can be maintained without increasing the thickness of the silicone film on the surface of the airbag.

A method of producing a weaving pattern for weaving the airbag includes: preparing a draft weaving pattern including a first region designed for the bag portion and a second region designed for the plain cloth portion; scanning a section of the draft weaving pattern around a border between the first region and the second region; determining whether the section includes an area in which a total number of the first cells and the third cells that are consecutive is more than three; if the section includes the area, correcting any one of the first cells and the third cells; determining whether the section includes an area in which a total number of the second cells and the fourth cells that are consecutive is more than three; if the section includes the area, correcting any one of the second cells and the fourth cells; determining whether the section includes an area in which four cells adjacent to each other in the rows and the columns are the first cells; and if the section includes the area, correcting any one of the four cells. The first region including first cells and second cells arranged in rows and columns. The first cells represent first intersections of the warp threads and the filling threads in the bag portion at which the warp threads are over the filling threads. The second cells represent second intersections of the warp threads and the filling threads in the bag portion at which the warp threads are under the filling threads. The second region including third cells and fourth cells arranged in rows and columns. The third cells represent third intersections of the warp threads and the filling threads in the plain cloth portion at which the warp threads are over the filling threads. The fourth cells represent fourth intersections of the warp threads and the filling threads in the plain cloth portion at which the warp threads are under the filling threads. According to the method, the weaving pattern for weaving the airbag that satisfies conditions (1) and (2) is produced. The airbag woven according to the weaving pattern has a proper level of the airtightness.

According to the technology described herein, the airtightness of the airbag is maintained without increasing the thickness of the film on the surface of the airbag.

BRIEF DESCRIPTION OF THE DRAWINGS

Figure 14:
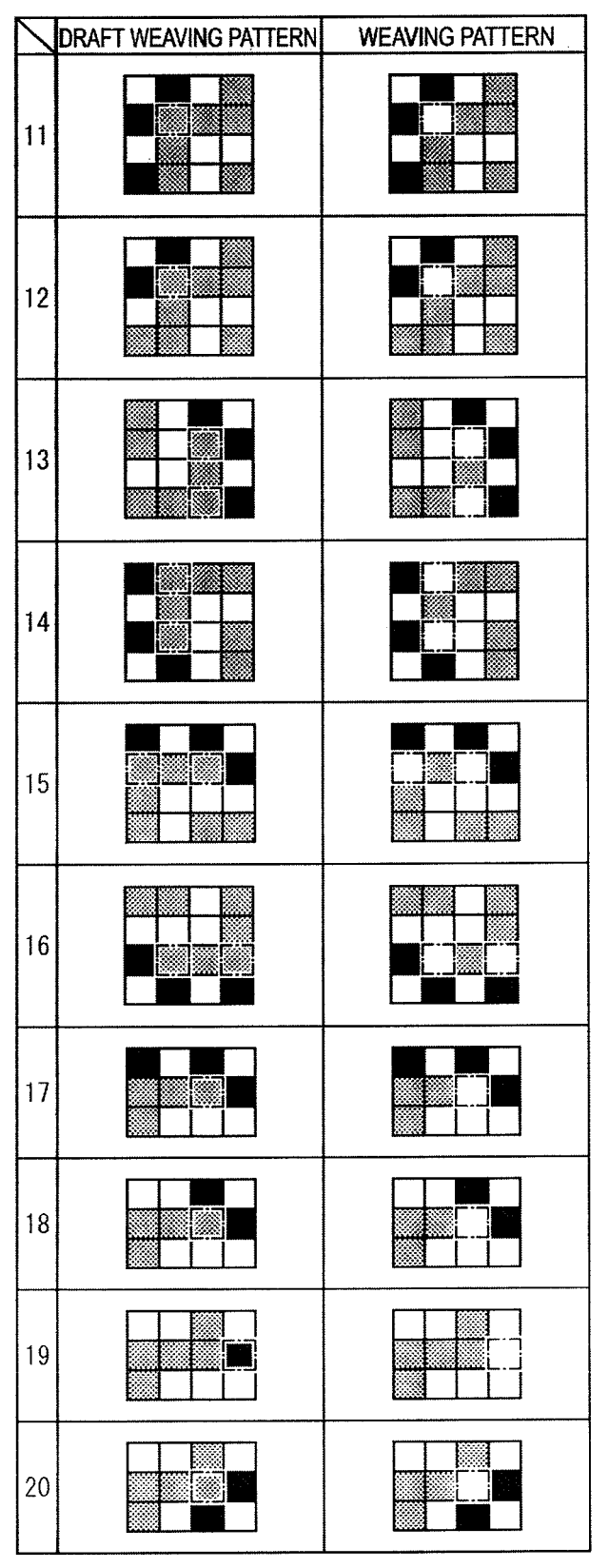

FIG. 14 is a table illustrating portions of the draft weaving pattern and the weaving pattern.

FIG. 15 is a table illustrating portions of the draft weaving pattern and the weaving pattern.

FIG. 16 is a table illustrating portions of the draft weaving pattern and the weaving pattern.

DETAILED DESCRIPTION

An embodiment will be described in detail with reference to FIGS. 1 to 16. An airbag 10 according to the embodiment is a curtain shield airbag installed in a curtain shield airbag system of a vehicle. The airbag 10 has a rectangular overall shape in an elevation view to extend in the front-rear direction when the airbag 10 is deployed. When an external force larger than a threshold is applied to the vehicle, gas is injected into the airbag by an inflator to inflate the airbag. The airbag is deployed along a side portion of a cabin of the vehicle. The deployed airbag covers a side window glass and a center pillar (a B pillar) of the vehicle to protect an occupant of the vehicle.

The airbag 10 and the inflator are stored in a roof side portion in an upper side of the cabin. In the roof side portion, the airbag is folded in an elongated shape in the front-rear direction of the vehicle. The airbag 10 includes a bag that is woven using the one piece woven (OPW) technology. With the OPW technology, two layers of cloth are simultaneously woven (double cloth) while a specified portion is woven to include a single layer of plain woven cloth. The bag is prepared without conventional sewing. Namely, the airbag 10 includes a double cloth portion including the two layers of cloth and a single cloth portion including the single layer of the plain cloth. Silicone films 16 (two-dot chain lines in FIG. 5) are formed on surfaces (inner and outer surfaces) of the cloth by a known method.

Figure 1:
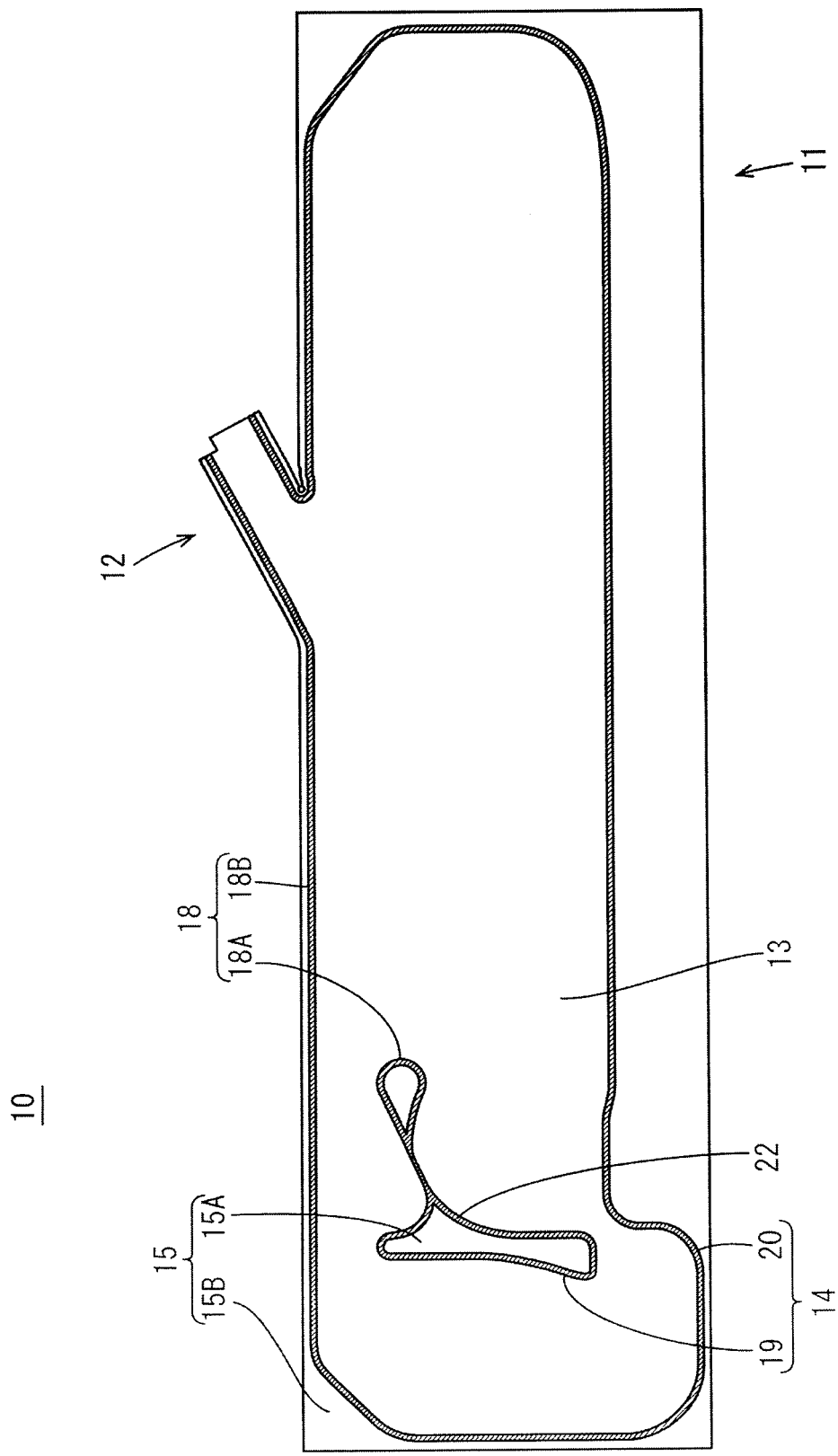
FIG. 1 is an elevation view of an airbag that is deployed according to an embodiment.

As illustrated in FIG. 1, the airbag 10 includes a body 11 and an inlet 12. The body 11 has a rectangular shape in an elevation view and a long dimension in the front-rear direction of the vehicle. The inlet 12 extends upward from the top of the body 11. The inlet 12 is connected to the inflator that is configured to inject gas when the curtain shield airbag system is activated. The airbag 10 includes a bag portion 13 (a double cloth portion), plain cloth portions 14, and non-inflatable portions 15. The bag portion 13 is woven by the double weave. The plain cloth portions 14 are woven by the plain weave. The gas is injected into the bag portion 13 of the body I 1 through the inlet 12 by the inflator to inflate the bag portion 13. The plain cloth portions 14 are a closed portion at edges of the bag portion 13. The plain cloth portions 14 defines a border between an inflatable portion (i.e., the bag portion 13) and the non-inflatable portions 15. The plain cloth portions 14 include a first plain cloth section 19 and a second plain cloth section 20. The first plain cloth section 19 is formed in a loop along the inner edge of the airbag 10. The second plain cloth section 20 is formed in a loop along the outer edge of the airbag 10.

Figure 2:
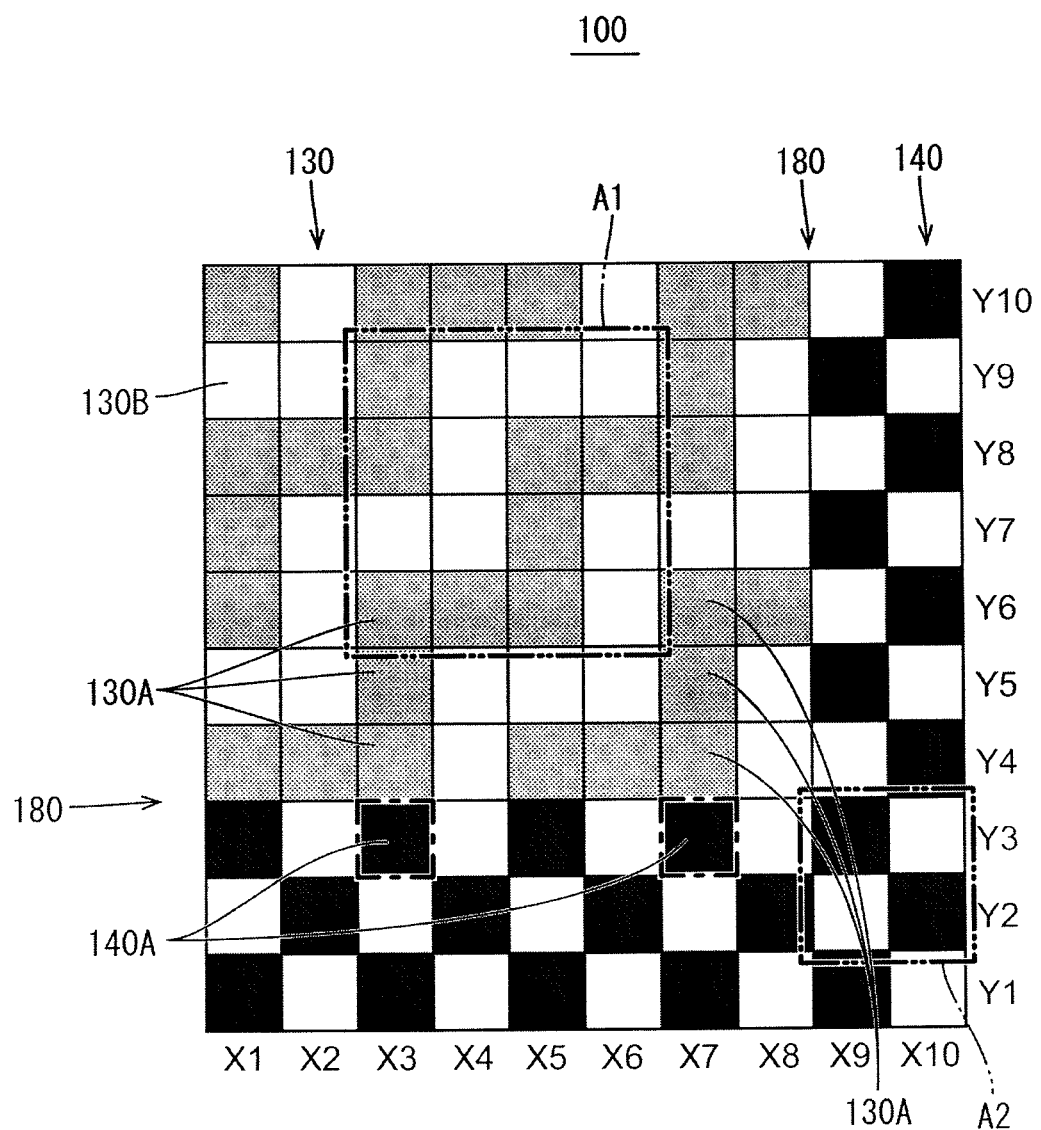
FIG. 2 is a partial view illustrating a draft weaving pattern for weaving the airbag.

To weave the bag portion 13, the first plain cloth section 19, and the second plain cloth section 20, a draft weaving pattern 100, a portion of which is illustrated in FIG. 2, is prepared. The draft weaving pattern 100 includes a first draft region 130 and a second draft region 140. The first draft region 130 includes a first pattern designed for weaving the bag portion 13. The second draft region 140 includes a second pattern designed for weaving the plain cloth portions 14. In FIG. 2, columns X1 to X10 represent warp threads and rows Y1 to Y10 represent filling threads.

The first draft region 130 includes first cells 130A and second cells 130B. The first cells 130A and the second cells 130B are in gray and in white in FIG. 2. The first cells 130A represent first intersections at which the warp threads are over the filling threads. The second cells 130B represent the second cells 130B at which the warp threads are under the filling threads. The second draft region 140 includes third cells 140A and fourth cells 140B. The third cells 140A and the fourth cells 140B are in black and in white, respectively, in FIG. 2. The third cells 140A represent third intersections at which the warp threads are over the filling threads. The fourth cells 140B represent fourth cells 140B at which the warp threads are under the filling threads. In the drawings, only some of the cells are denoted by reference symbols for simplification.

The first pattern includes a number of first repeats. In FIG. 2, an area A1 defined by a two-dot chain line in the first draft region 130 represents one of the first repeats (a minimum unit) of the draft weaving pattern 100 in the first draft region 130. The second pattern includes a number of second repeats. In FIG. 2, an area A2 defined by a two-dot chain line in the second draft region 140 represents one of the second repeats (a minimum unit) of the draft weaving pattern 100 in the second draft region 140.

In each first repeat, three of the first cells 130 are consecutively arranged in one column. For example, in the area A1, the first cells 130A in rows Y6 to Y8 are consecutively arranged in column X5. In each second repeat, the third cells 140A and the fourth cells 140B are alternately arranged. When the first repeats and the second repeats are arranged to form the shape of the bag portion 13, the shape of the first plain cloth portion 19, and the shape of the second plain cloth portion 20, respectively, three first cells 130A and one third cell 140A may be consecutive in one column around the border 180. This may happen in some columns. For example, the first cells 130A in rows Y4 to Y6 and one third cell 140A in row Y3 are consecutively arranged in each of columns X3 and X 7 (one warp thread is over four consecutive filling threads) around the border 180 in FIG. 2.

When the bag portion 13 is inflated, stresses may be applied to the inner border 18A between the bag portion 13 and first plain cloth section 19 and the outer boarder 18B between the bag portion 13 and the second plain cloth section 20. The stresses may cause displacement of the warp threads and the filling threads from one another, resulting in expansion of gaps among the warp threads and the filling threads. If that happens, airtightness of the airbag 10 decreases. In sections of woven cloth including a larger number of warp floats or weft floats, the warp threads and the filling threads are more likely to be displaced from one another. Namely, the gaps are more likely to be created in such sections. Specifically, in sections of the airbag 10 corresponding to sections of the draft weaving pattern 100 in which the first cells 130A are consecutively arranged, the first cells 130A and the third cells 140A are consecutively arranged, the second cells 130B are consecutively arranged, and the second cells 130B and the fourth cells 140B are consecutively arranged, the larger number of warp floats or weft floats may be present. The larger the number of the warp floats or the weft floats is, the higher in possibility of the displacement is.

Figure 3:
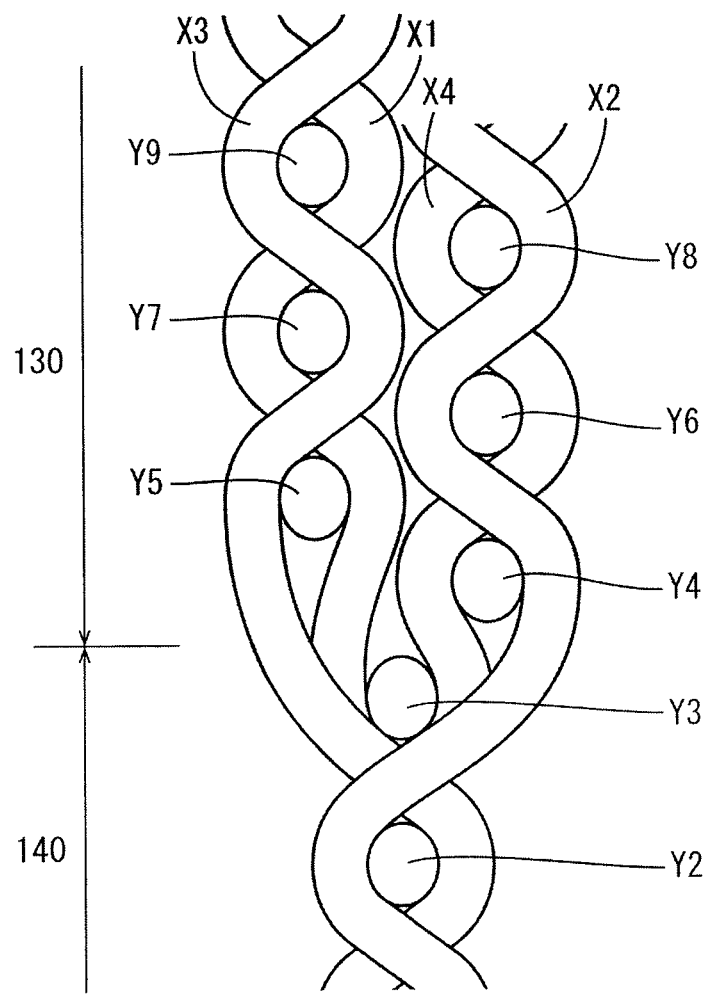
FIG. 3 is a schematic diagram illustrating warp threads and filling threads regarding the draft weaving pattern in FIG. 2.
Figure 4:
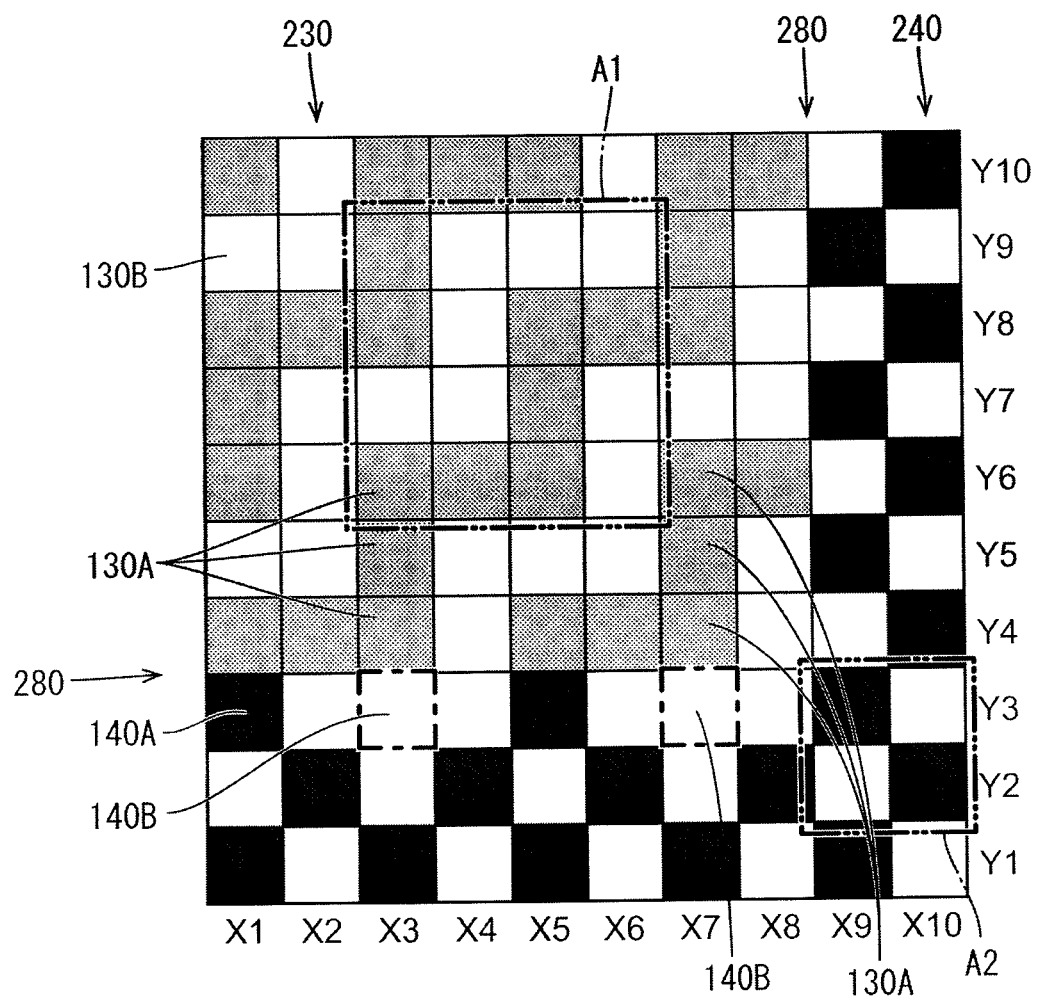
FIG. 4 is a partial view illustrating a weaving pattern prepared based on the draft weaving pattern.
Figure 5:
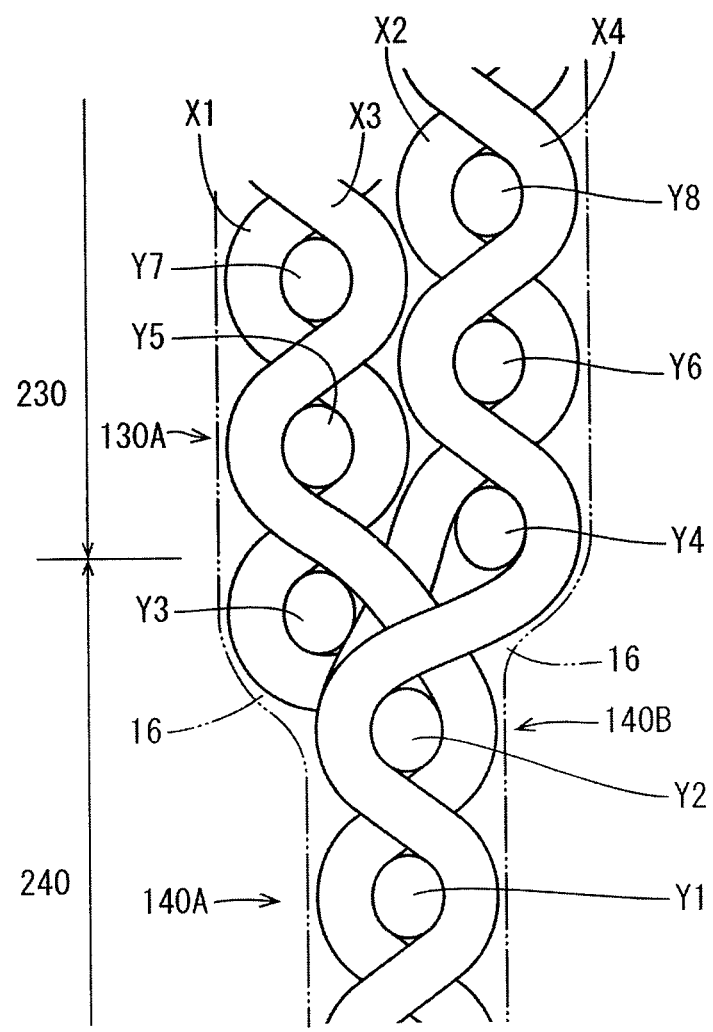
FIG. 5 is a schematic diagram illustrating warp threads and weft threads regarding the weaving pattern in FIG. 4.

If the bag portion 13 and the plain cloth portions 14 are woven according to the draft weaving pattern 100, the filling thread represented by row Y3 may include a float section as illustrated in FIG. 3. The float section may cause the displacement. To reduce the displacement, a weaving pattern 200, a portion of which is illustrated in FIG. 4, is prepared based on the draft weaving pattern 100. Specifically, the first cells 140A in columns X3 and X7 are corrected to be the second cells 140B so that a total number of the first cells 130A and the third cells 140A that are consecutive in one column is less than four. With the correction, the filling thread represented by row Y3 no longer has the float section.

The weaving pattern 200 illustrated in FIG. 4 includes a first region 230 and a second region 240. The first region 230 has a configuration similar to that of the first draft region 130 of the draft weaving pattern 100. Some of the third cells 140A in the draft weaving pattern 100 are replaced with the fourth cells 140B in the weaving pattern 200.

Figure 6:
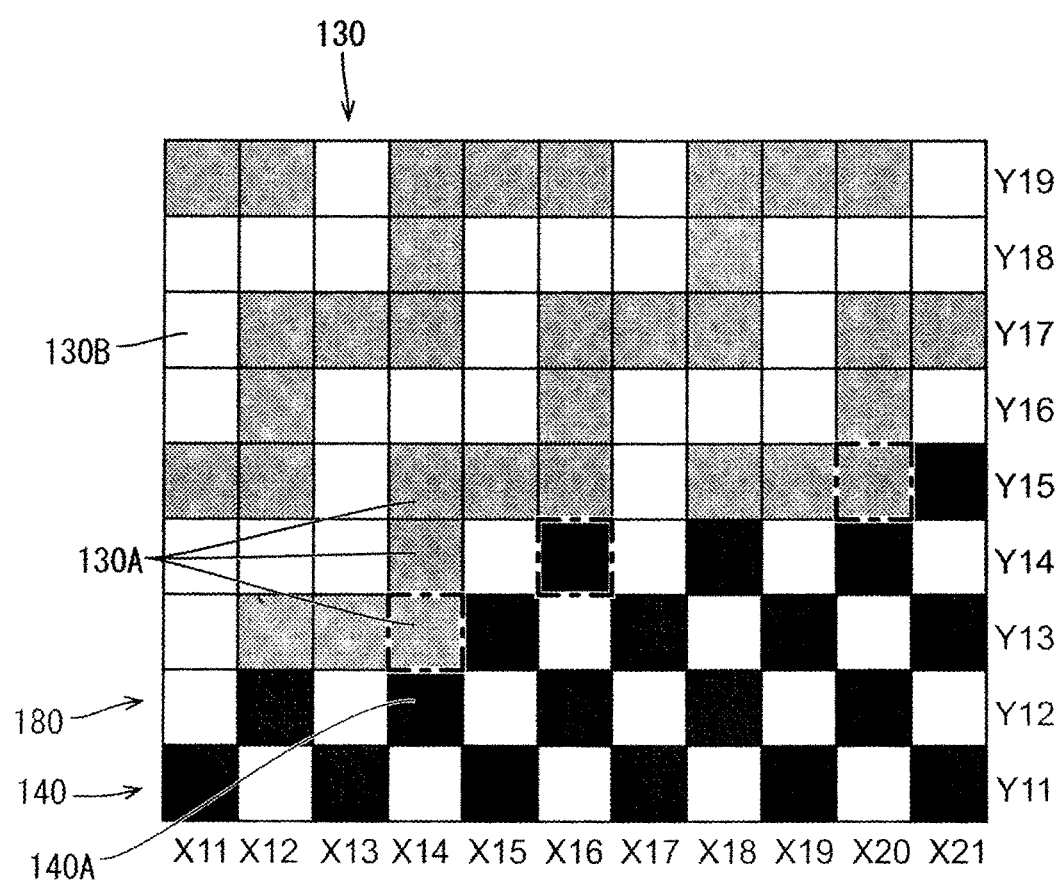
FIG. 6 is a partial view illustrating a portion of the draft weaving pattern including a section of a boundary which extends at an angle relative to rows.
Figure 7:
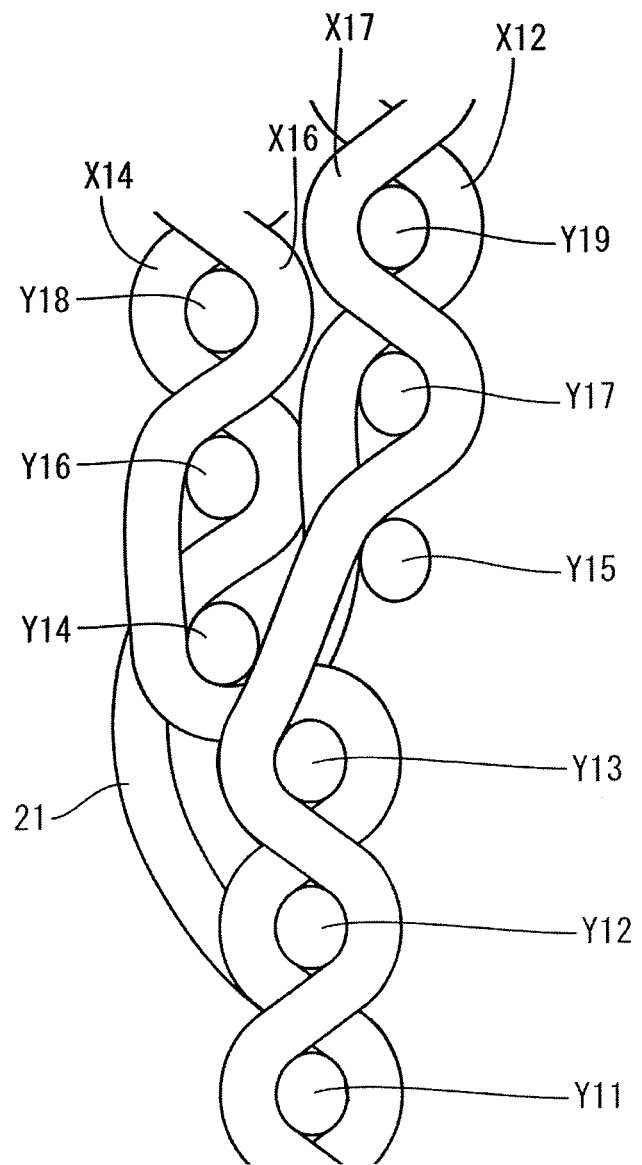
FIG. 7 is a schematic diagram illustrating warp threads and weft threads regarding the weaving pattern in FIG. 6.

Another portion of the draft weaving pattern 100 is illustrated in FIG. 6. In FIG. 6, columns X11 to X21 and rows Y11 to Y19 represent warp threads and filling threads, respectively. The border 180 is angled relative to rows Y11 to Y19 to incline from column X11 side to column X21 side. Three first cells 130A and one third cell 140A are consecutively arranged in some columns. For example, the first cells 130A in rows Y13 to Y15 and one third cell 140A in row Y12 are consecutively arranged in column X14 around the border 180. If the bag portion 13 and the plain cloth portions 14 are woven according to the draft weaving pattern 100, the warp thread represented by column X14 may have a float section 21 as illustrated in FIG. 7. The same problem may occur at the first cells 130A and the third cells 140A indicated by chain-line squares in FIG. 6. This may cause displacement of threads.

Figure 8:
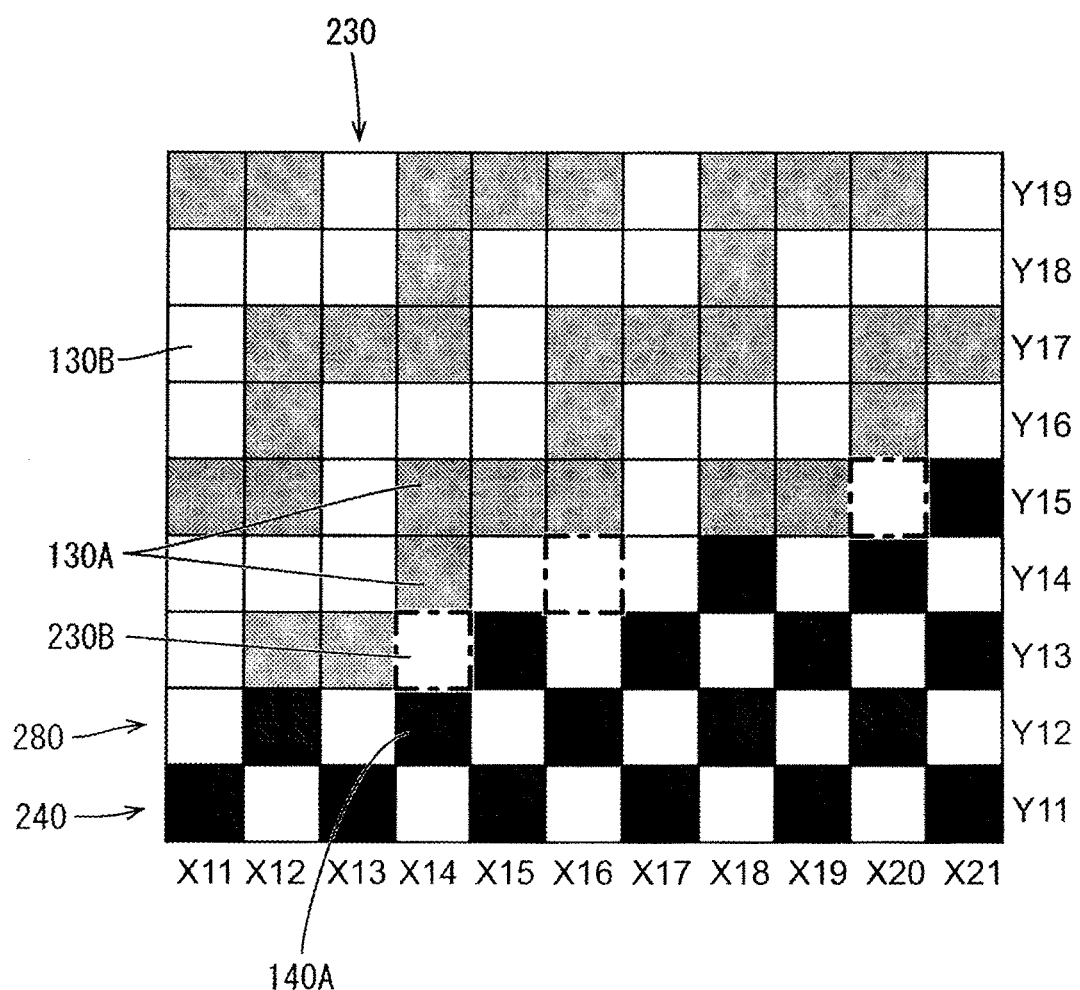
FIG. 8 is a partial view illustrating a portion of the weaving pattern prepared based on the draft weaving pattern in FIG. 6.
Figure 9:
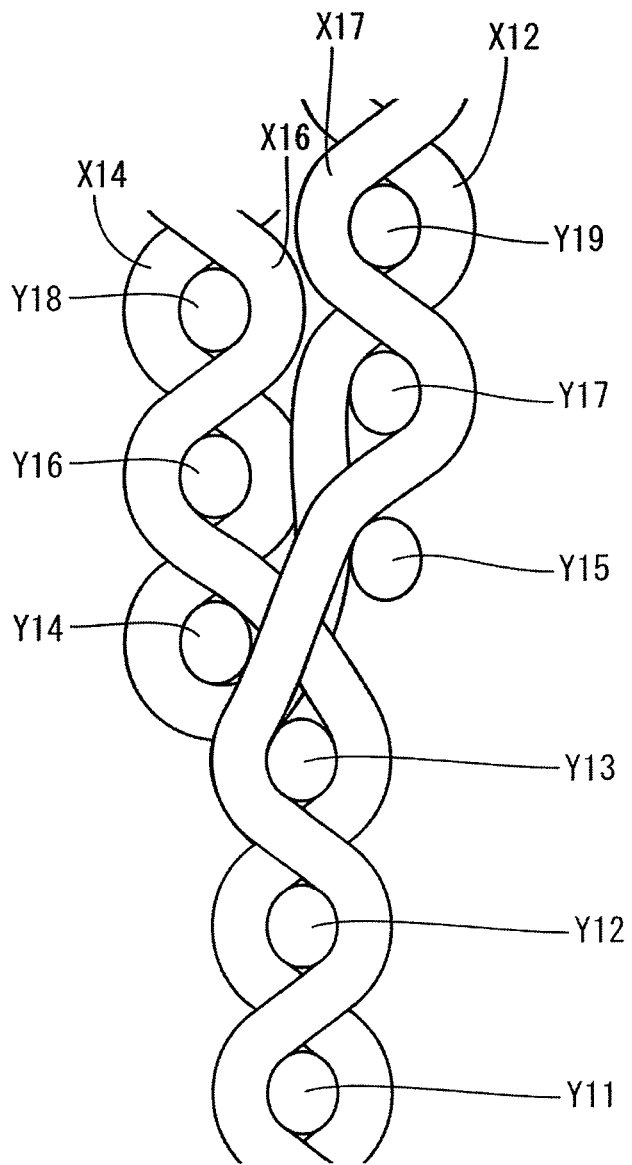
FIG. 9 is a schematic diagram illustrating warp threads and weft threads regarding the weaving pattern in FIG. 8.

To reduce the displacement, the cells 130A and 140A in the chain-line squares are corrected as illustrated in FIG. 8 so that each warp thread is not over four consecutive filling threads. Namely, four cells including three first cells 130A and one third cell 140A are not consecutively arranged. When the bag portion 13 and the plain cloth portions 14 are woven according to the weaving pattern 200, the warp thread represented by column X14 no longer has the float section 21 as illustrated in FIG. 9.

Inventors of the present application have confirmed that the displacement of the threads is less likely to occur if the number of the consecutive filling threads over which each warp thread runs or the number of the warp threads over which each filling thread runs under is less than four. However, if the number is more than three, the displacement of the threads is more likely to occur.

Figure 10:
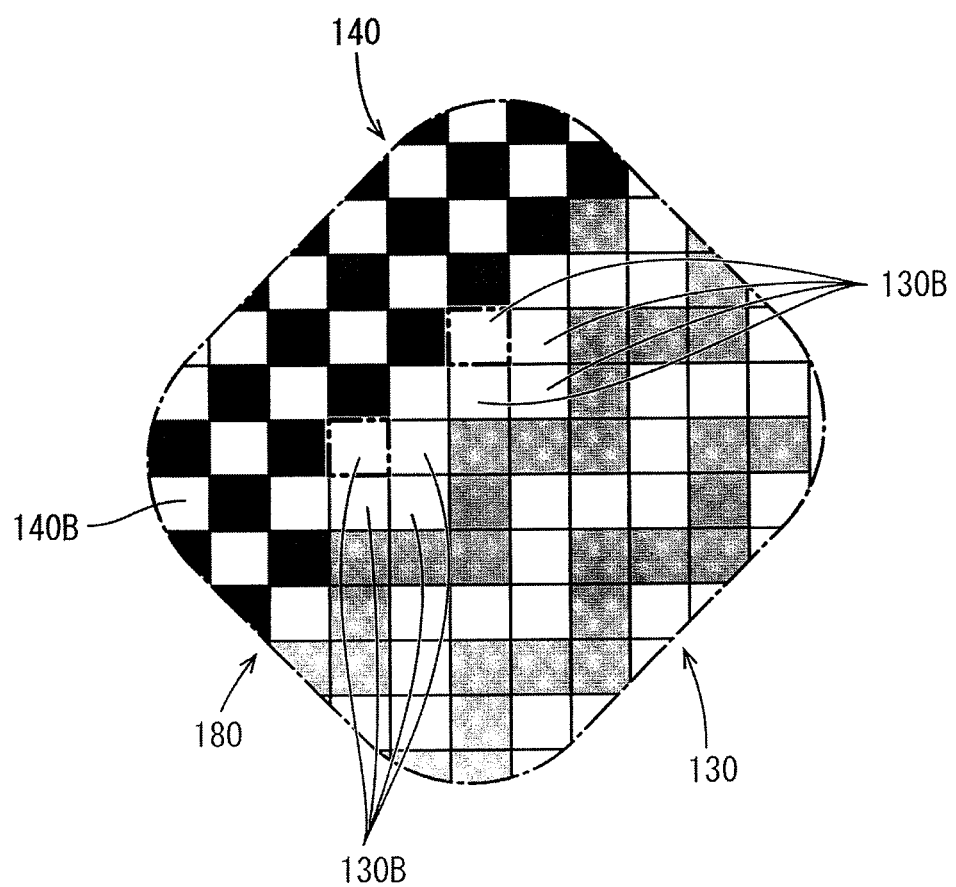
FIG. 10 is a partial view illustrating a portion of the draft weaving pattern.
Figure 11:
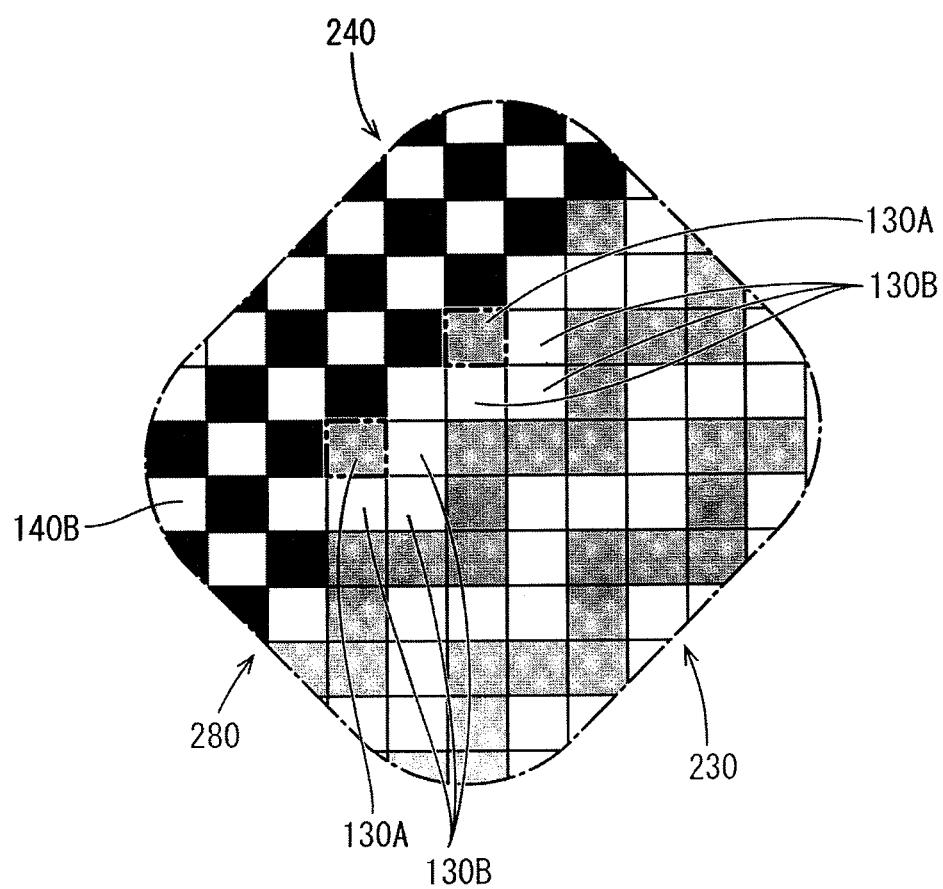
FIG. 11 is a partial view illustrating a portion of the weaving pattern prepared based on the draft weaving pattern in FIG. 10

Another portion of the draft weaving pattern 100 is illustrated in FIG. 10. Around the border 180 that extends at an angle relative to the columns, four cells adjacent to each other in columns and rows (2-by-2 cells) are more likely to be the second cells 130B. If so, the warp threads and the filling threads are more likely to be displaced from each other. Therefore, one of the second cells 130B is corrected to be the first cells 130A as illustrated in FIG. 11. One of every 2-by-2 cells in the weaving pattern 200 includes one first cell 130A. If the 2-by-2 cells are all the first cells 130A, the same problem may happen. Therefore, similar correction may be required. 100401 Therefore, the weaving pattern 200 is designed to satisfy the following two conditions: (1) each warp thread is not over four consecutive filling threads and each filling thread is not over four consecutive warp threads; and (2) every two adjacent filling threads are not over two adjacent warp threads.

Figure 12:
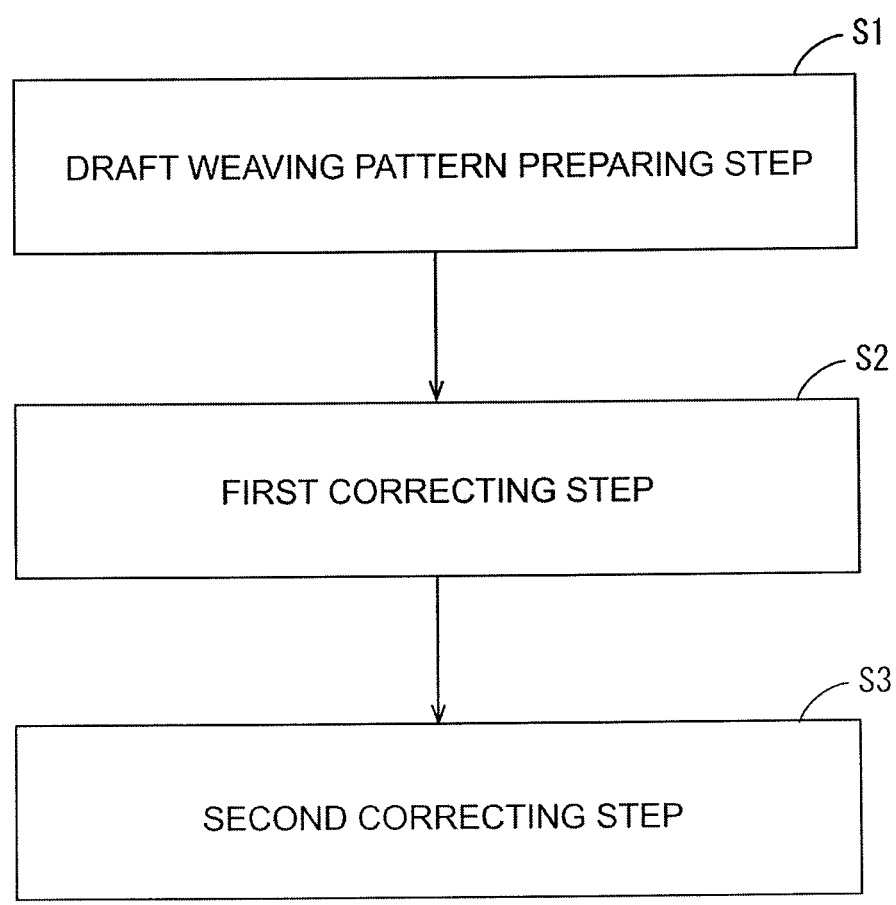
FIG. 12 is a flowchart illustrating a method of producing the weaving pattern.
Figure 13:
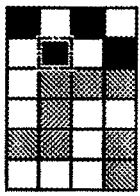
FIG. 13 is a table illustrating portions of the draft weaving pattern and the weaving pattern.
Figure 13:
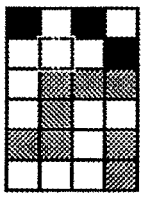
Figure 13:
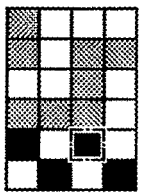
Figure 13:
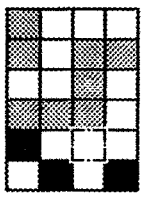
Figure 13:
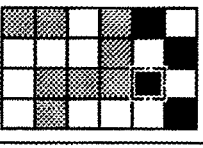
Figure 13:
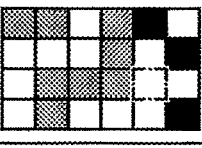
Figure 13:
Figure 13:
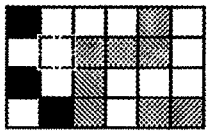
Figure 13:
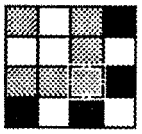
Figure 13:
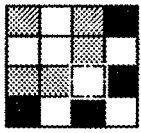
Figure 13:
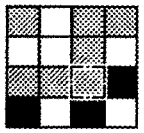
Figure 13:
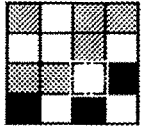
Figure 13:
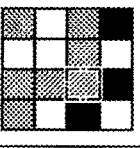
Figure 13:
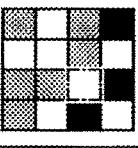
Figure 13:
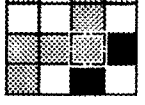
Figure 13:
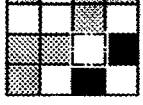
Figure 13:
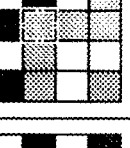
Figure 13:
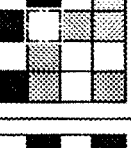
Figure 13:
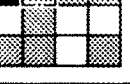
Figure 13:
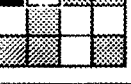

A method of producing the weaving pattern 200 will be described. The weaving pattern 200 may be produced, but not limited to, using a specialized computer program on a computer. As illustrated in FIG. 12, the method includes a draft weaving pattern preparing step (S1), a first correcting step (S2), and a second correcting step (S3). In step S1, the draft weaving pattern 100 is prepared. Specifically, the first repeats are repeatedly arranged in the first draft region 130 to form the shape of the bag portion 13 and the second repeats are repeatedly arranged in the second draft region 140 to form the shape of the plain cloth portions 14. In step S2, the draft weaving pattern 100 is corrected to satisfy condition (1). In step S3, the draft weaving pattern 100 is corrected to satisfy condition (2).

In step S2, the computer scans an entire section of the draft weaving pattern 100 around the border 180 and determines whether the section includes an area in which a total number of the first cells 130A and the third cells 140A that are consecutive is more than three. If the section includes the area, the computer corrects any one of the first cells 130A and the third cells 140Athe draft weaving pattern 100 to satisfy condition (1). For example, the first cells 130A in the chain-line squares in columns X3 and X7 in FIG. 2 are corrected to be the second cells 130B as illustrated in FIG. 4. In the drawings, the cells to be corrected are indicated by chain-line squares.

In step S2, one of two first cells 130A closer to the second draft region 140 may be corrected in every four consecutive cells. If the section includes the area in which a total number of the second cells 130B and the fourth cells 140B that are consecutive is more than three, at least one of the second cells 130B and the fourth cells 140B is corrected to be the first cell 130A.

In step S3, the computer scans the entire section of the draft weaving pattern 100 around the border 180 and determines whether the section includes an area in which four cells adjacent to each other in rows and columns are the first cells to detect an area that does not satisfy condition (2). For example, the second cells 130B in the chain-line squares in FIG. 10 are corrected to be the first cells 130A as illustrated in FIG. 11.

In step S3, one of four second cells 130B the closest to the second draft region 140 may be corrected. If the 2-by-2 cells are all the first cells 130A, one of the first cells 130A may be corrected to be the second cell 130B.

When all the corrections in steps S2 and S3 are complete, the weaving pattern 200 is prepared. Sections of the draft weaving pattern 100 are present in left columns of the tables in FIGS. 13 to 16. Sections of the weaving pattern 200 are present in right columns in FIGS. 13 to 16. Rows 1 to 36 in FIGS. 13 to 16 correspond to step S2. Rows 37 to 39 in FIG. 16 correspond to step S3. In step S2, two of the four consecutive first cells 130A may be corrected as in row 14 or 15 in FIG. 14. By correcting the cells in all the detected areas around the border 180 in step S2 and S3, the weaving pattern 200 for weaving the airbag 10 that satisfies conditions (1) and (2) are prepared.

The plain cloth portions 14 at the edges of the bag portion 13 is prepared by plain weave and thus stronger than the bag portion 13. Therefore, the airbag 10 has strength at the border 18 between the bag portion 13 and the plain cloth portions 14. With the plain cloth portions 14, the displacement of the threads is less likely to occur when the bag portion 13 is inflated. If a larger number of the warp floats and the weft floats are present, the displacement of the threads is more likely to occur. By weaving the bag portion 13 and the plain cloth portions 14 according to the weaving pattern 200 to satisfy conditions (1) and (2), the warp threads are less likely to run over more than four consecutive filling threads or the filling threads are less likely to run over more than four consecutive warp threads. Therefore, the displacement of the threads is less likely to occur and thus the airtightness of the airbag 10 can be maintained without increasing the thickness of the silicone films 16 on the surface of the airbag 10.

If two second cells 130B and two fourth cells 140B are present in two consecutive rows and two consecutive columns, one of the fourth cells 140B (farther from the first draft region 130) may be corrected so that the correction is less likely to affect the bag portion 13. If one of the second cells 130B is corrected, the correction may affect the bag portion 13. Namely, a section of the edge of the bag portion 13 is closed. By correcting one of the fourth cells 140B, such a problem is less likely to occur.

As illustrated in FIG. 1, the first plain cloth section 19 includes a curved section 22. When the bag portion 13 is inflated, stress is more likely to concentrate on the curved section 22 and thus it may cause a reduction in airtightness. In this embodiment, the displacement of the threads is less likely to occur and thus the airtightness is maintained even at the curved section 22.

Other Embodiments

The technology described herein is not limited to the embodiment described in the above description and the drawings.

(1) The technology described herein may be applied to any types of airbags.

(2) The technology described herein may be applied to other weaving patterns for airbags having different configurations from those of the bag portion 13 and the pain cloth portion 14.

(3) Other kinds of films may be formed on the surface of the airbag 10 other than the silicone film 16.

(4) Step 3 may be performed before step 2.

The invention claimed is:

1. A method of producing a weaving pattern for weaving an airbag comprising:
a bag portion woven by double weave; and
a plain cloth portion woven by plain weave at an edge of the bag portion, wherein
the bag portion and the plain cloth portion include warp threads and filling threads, and
the bag portion and the plain cloth portion are woven by a one piece woven method to satisfy: (1) each warp thread is not over four consecutive filling threads and each filling thread is not over four consecutive warp threads around a border between the bag portion and the plain cloth portion; and (2) every two adjacent warp threads are not over two adjacent filling threads and every two adjacent filling threads are not over two adjacent warp threads around the border, the method comprising:
preparing a draft weaving pattern including a first region designed for the bag portion and a second region designed for the plain cloth portion, the first region including first cells and second cells arranged in rows and columns, wherein
the first cells represent first intersections of the warp threads and the filling threads in the bag portion at which the warp threads are over the filling threads, and
the second cells represent second intersections of the warp threads and the filling threads in the bag portion at which the warp threads are under the filling threads, the second region including third cells and fourth cells arranged in rows and columns, wherein
the third cells represent third intersections of the warp threads and the filling threads in the plain cloth portion at which the warp threads are over the filling threads, and the fourth cells represent fourth intersections of the warp threads and the filling threads in the plain cloth portion at which the warp threads are under the filling threads;
scanning a section of the draft weaving pattern around a border between the first region and the second region;
determining whether the section includes an area in which a total number of the first cells and the third cells that are consecutive is more than three;
if the section includes the area in which the total number of the first cells and the third cells that are consecutive is more than three, correcting any one of the first cells and the third cells;
determining whether the section includes an area in which a total number of the second cells and the fourth cells that are consecutive is more than three;
if the section includes the area in which the total number of the second cells and the fourth cells that are consecutive is more than three, correcting any one of the second cells and the fourth cells;
determining whether the section includes an area in which four cells adjacent to each other in the rows and the columns are the first cells; and
if the section includes the area in which four cells adjacent to each other in the rows and the columns are the first cells, correcting any one of the four cells.

2. The method according to claim 1, wherein the correcting any one of the first cells and the third cells includes correcting one of the first cells and the third cells closer to the plain cloth portion.

3. The method according to claim 1, wherein the correcting any one of the second cells and the fourth cells includes correcting one of the second cells and the fourth cells closer to the plain cloth portion.

4. The method according to claim 1, wherein the correcting is a modifying of the draft weaving pattern to change one or more selected cells in an area of a border area between the first region and the second region from their pattern established by the draft weaving pattern when the one or more selected cells in the border area violate the rules for the border area.

5. The method according to claim 1, further comprising at least one of:
identifying the area in which the total number of first cells and the third cells that are consecutive are more than three, identifying the area in which the total number of second cells and the fourth cells that are consecutive are more than three, and identifying the area in which the four cells adjacent to each other in the rows and the columns are the first cells.

6. An airbag comprising:
an inflatable portion woven by double weave so that the inflatable portion inflates when the airbag is activated, the inflatable portion including a first inflatable section having a first shape and a second inflatable section coupled to the first inflatable section and having a second shape that is different from the first inflatable section and dimensions different from dimensions of the first inflatable section;
a plain cloth portion woven by plain weave and coupled to the inflatable portion, the plain cloth portion including a first plain cloth section coupled to an outer edge of the first inflatable section and a second plain cloth section coupled to an outer edge of the second inflatable section; and
a non-inflatable portion coupled to the plain cloth portion, wherein the inflatable portion, the plain cloth portion, and the non-inflatable portion include warp threads and filling threads such that:
each warp thread is not over four consecutive filling threads and each filling thread is not over four consecutive warp threads around a first border between the first inflatable section and the first plain cloth section;
every two adjacent warp threads are not over two adjacent filling threads and every two adjacent filling threads are not over two adjacent warp threads around the first border;
each warp thread is not over four consecutive filling threads and each filling thread is not over four consecutive warp threads around a second border between the second inflatable section and the second plain cloth section; and
every two adjacent warp threads are not over two adjacent filling threads and every two adjacent filling threads are not over two adjacent warp threads around the second border.

7. The airbag according to claim 6, wherein
one of the dimensions of the first inflatable section along the warp threads is less than one of the dimensions of the second inflatable section along the warp threads, and
one of the dimensions of the first inflatable section along the filling threads is greater than one of the dimensions of the second inflatable section along the filling thread.

8. The airbag according to claim 6, wherein
the non-inflatable portion includes a first non-inflatable section inside the inflatable portion and a second non-inflatable section outside the inflatable portion,
the plain cloth portion includes a third plain cloth section inside the inflatable portion,
the third plain cloth section includes an inner edge coupled to the first non-inflatable section and an outer edge coupled to the inflatable portion,
each warp thread is not over four consecutive filling threads and each filling thread is not over four consecutive warp threads around a third border between the inflatable portion and the third plain cloth section, and
every two adjacent warp threads are not over two adjacent filling threads and every two adjacent filling threads are not over two adjacent warp threads around the third border.

9. The airbag according to claim 8, wherein
the first non-inflatable section has an irregular outline, and the third plain cloth section extends along the irregular outline of the first non-inflatable section.

10. A method of producing the airbag according to claim 6, the method comprising:
preparing a draft weaving pattern including cells arranged in rows and columns in a first region for weaving the first inflatable section, a second region for weaving the second inflatable section, a third region for weaving the first plain cloth section, and a fourth region for weaving the second plain cloth portion;
indicating first cells in a first color to represent the warp threads that are under the filling threads in the first region, the second region, the third region, and the fourth region;
indicating second cells in a second color to represent the warp threads that are over the filling threads in the first region and the second region;
indicating third cells in a third color to represent the warp threads that are over the filling threads in the third region and the fourth region;
scanning the draft weaving pattern;
identifying the second cells, three of which are consecutive around a horizontal section of the first border;
identifying one of the third cells consecutive to the identified second cells around the horizontal section of the first border;
modifying a color of the one of the third cells around the horizontal section of the first border to the first color;
identifying the second cells, three of which are consecutive around a vertical section of the first border;
identifying one of the third cells consecutive to the identified second cells around the vertical section of the first border;
modifying a color of the one of the third cells around the vertical section of the first border to the first color;
identifying the second cells, three of which are consecutive around an angled section of the first border;
identifying one of the third cells consecutive to the identified second cells around the angled section of the first border;
modifying a color of the one of the second cells around the angled section of the first border to the first color;
preparing a weaving pattern based on the draft weaving pattern as modified; and
weaving the airbag according to the weaving pattern.

11. The method according to claim 10, wherein
the draft weaving pattern includes a fifth region for weaving a third plain cloth section that is inside the inflatable portion and includes an inner edge coupled to the first non-inflatable section and an outer edge coupled to the inflatable portion,
the outer edge of the third plan cloth section is defined as a third border, and
the method further comprising:
indicating first cells in the first color to represent the warp threads that are under the filling threads in the fifth region,
indicating third cells in the third color to represent the warp threads that are over the filling threads in the fifth region,
identifying the second cells, three of which are consecutive around a horizontal section of the third border,
identifying one of the third cells consecutive to the identified second cells around the horizontal section of the third border,
modifying a color of the one of the third cells around the horizontal section of the third border to the first color,
identifying the second cells, three of which are consecutive around a vertical section of the third border, identifying one of the third cells consecutive to the identified second cells around the vertical section of the third border,
modifying a color of the one of the third cells around the vertical section of the third border to the first color,
identifying the second cells, three of which are consecutive around an angled section of the third border,
identifying one of the third cells consecutive to the identified second cells around the angled section of the third border, and
modifying a color of the one of the second cells around the angled section of the third border to the first color.

* * * * *